United States Patent
Caillaud

(10) Patent No.: US 8,214,136 B2
(45) Date of Patent: Jul. 3, 2012

(54) DEVICE AND METHOD FOR ASSISTING IN THE CHOICE OF REROUTING AIRPORTS

(75) Inventor: Christophe Caillaud, Blagnac (FR)

(73) Assignee: Thales (FR)

( * ) Notice: Subject to any disclaimer, the term of this patent is extended or adjusted under 35 U.S.C. 154(b) by 1137 days.

(21) Appl. No.: 11/963,772

(22) Filed: Dec. 21, 2007

(65) Prior Publication Data

US 2010/0042316 A1 Feb. 18, 2010

(30) Foreign Application Priority Data

Dec. 22, 2006 (FR) ...................... 06 11273

(51) Int. Cl.
*G01C 21/00* (2006.01)

(52) U.S. Cl. ........ 701/120; 701/121; 701/484; 701/528; 340/572.1; 244/175

(58) Field of Classification Search ............. 701/201, 701/120, 16, 210, 209; 340/572.1; 244/175
See application file for complete search history.

(56) References Cited

U.S. PATENT DOCUMENTS

| | | | | | |
|---|---|---|---|---|---|
| 5,398,186 | A | * | 3/1995 | Nakhla | 701/16 |
| 5,627,517 | A | * | 5/1997 | Theimer et al. | 340/572.1 |
| 5,842,142 | A | * | 11/1998 | Murray et al. | 701/16 |
| 6,415,291 | B2 | * | 7/2002 | Bouve et al. | 701/533 |
| 6,519,527 | B2 | * | 2/2003 | Shinagawa | 701/411 |
| 6,856,864 | B1 | * | 2/2005 | Gibbs et al. | 701/3 |
| 7,385,527 | B1 | * | 6/2008 | Clavier et al. | 340/945 |
| 7,454,203 | B2 | * | 11/2008 | Levitan | 455/431 |
| 7,546,206 | B1 | * | 6/2009 | Miller et al. | 701/415 |
| 7,664,596 | B2 | * | 2/2010 | Wise et al. | 701/120 |
| 7,874,521 | B2 | * | 1/2011 | Shuster | 244/175 |
| 7,979,199 | B2 | * | 7/2011 | Judd et al. | 701/120 |
| 8,014,912 | B2 | * | 9/2011 | Zadrozynski et al. | 701/16 |
| 2003/0078719 | A1 | * | 4/2003 | Zobell et al. | 701/120 |
| 2007/0299597 | A1 | * | 12/2007 | Fetzmann et al. | 701/120 |
| 2008/0004792 | A1 | * | 1/2008 | Wise et al. | 701/120 |
| 2009/0043434 | A1 | * | 2/2009 | Deker | 701/16 |
| 2010/0042316 | A1 | * | 2/2010 | Caillaud | 701/201 |

FOREIGN PATENT DOCUMENTS

| | | |
|---|---|---|
| EP | 0743580 A1 | 11/1996 |
| EP | 1243895 A2 | 9/2002 |

OTHER PUBLICATIONS

Sowden: "Alternate Airport Selection During Flight Planning to Enhance Fuel Efficiency"; Online; Nov. 5, 2002, XP002447888.

* cited by examiner

*Primary Examiner* — Thomas Black
*Assistant Examiner* — Wae Louie
(74) *Attorney, Agent, or Firm* — Lowe Hauptman Ham & Berner, LLP

(57) ABSTRACT

The invention relates to assistance in the navigation of an aircraft in the cruising phase, particularly in an emergency rerouting situation. The invention relates to a method of assisting in the choice of rerouting airports for an aircraft having a position P and a speed V.: generating A first list LAC_1 of airport names $A_i$ is generated. The first list LAC_1 has N airport names, with i being an index between 1 and N which uniquely identifies an airport that an organization operating the aircraft chooses as a relevant destination. A number m is determined which is a minimum between a predefined number M and the number N. M airport names are presented from the first list LAC_1 to an operator of the aircraft in a predefined order.

17 Claims, 5 Drawing Sheets

| REROUTING AIRPORTS | | | | | | | |
|---|---|---|---|---|---|---|---|
| COMPANY ARPTS | PROX ARPTS | | | | | | |
| FROM A/C | TIME | TRK | DIST | NTWK CNT | FUEL | WIND | |
| ▶ LFBO | 03H22 | 120° | 42NM | 12 | 5.3 | 130HD | |
| ▶ LFBP | 03H27 | 150° | 75NM | 10 | 4.8 | 130HD | |
| ▶ LFMK | 03H42 | 30° | 80NM | 5 | 4.7 | 45TL | |

FIG.3

DEVICE AND METHOD FOR ASSISTING IN THE CHOICE OF REROUTING AIRPORTS

RELATED APPLICATIONS

The present application is based on, and claims priority from, French Application Number 06 11273, filed Dec. 22, 2006, the disclosure of which is hereby incorporated by reference herein in its entirety.

TECHNICAL FIELD

The invention relates to assistance in navigating an aircraft in the cruising phase, especially in an emergency rerouting situation.

BACKGROUND OF THE INVENTION

More specifically, the invention relates to a method of assisting an operator piloting an aircraft operated by an organization in a choice of rerouting airports by the operator. The operator should preferably land the aircraft at an airport belonging to the network of the organization. Since a rerouting generates delays for the passengers of the aircraft and additional costs for the organization, the rerouting of the aircraft to an airport in which the organization has a commercial service will have an economic impact that it will more easily be able to absorb. In this document, the terms "airline company" or "company" are used to denote an organization that operates an aircraft.

An aircraft is normally equipped with a flight management system FMS which helps the operator, particularly in generating a flight plan and during the cruising phase.

The FMS can access a navigation database, or NAVDB, which contains aeronautical information concerning a wide geographic zone, for example Europe, in particular information on the airports and the runways of the airports (orientation, length, etc.). The navigation database NAVDB contains an AIRPORTS table containing the names of all the airports in a given geographic zone.

Normally, the company that operates the aircraft equips the aircraft with a CoRoute database which contains routes linking predefined airports from the airport names in the AIRPORTS table. These routes contain information on the air corridors to be taken by the aircraft to link two given airports. The information in the CoRoute database facilitates the programming of the flight plans. This CoRoute database is bought by the company from an aeronautical database supplier. The price of the CoRoute base is linked to the number of routes that it contains. Consequently, a CoRoute database bought by an airline company preferably contains routes that exclusively link airports that are served regularly by the company and in which it has a technical or commercial establishment. The establishment is either wholly owned by the company or is made available by a company allied under the terms of cross agreements (this latter situation is known as a "code-share" situation).

Before a flight, the operator enters into the FMS the name of the airport of departure and the name of the destination airport that the aircraft is required to reach. From information contained in the CoRoute database, and by taking into account meteorological information, the FMS establishes a nominal flight plan to be followed by the aircraft to link the airport of departure to the destination airport. The information contained in the CoRoute database helps facilitate the creation of the flight plan.

Once the destination airport has been selected and the nominal flight plan created, the operator must also, by regulations, programme a flight plan linking the destination airport to an alternate airport.

To do this, the FMS first accesses an ALTERNATE DESTINATION database which contains a list made up of the names of alternate airports related to the destination airport. Then, the FMS automatically generates a flight plan to link the destination airport and the alternate airport chosen by the operator.

The ALTERNATE DESTINATION database associates, with an airport in the AIRPORTS table, a list of pre-established alternate airport names. The creation of this list is based on a distance criterion between the geographic position of the destination airport and the geographic position of the alternate airport. The distance criterion uses a "ground distance", that is, a distance to be travelled over the Earth to reach the geographic position of the destination airport from the geographic position of the alternate airport.

Normally, an airport $A_d$ is included in a list of alternate airports associated with a destination airport $A_{ID}$, if it has a geographic position that satisfies two constraints:
  on the one hand, the ground distance separating the alternate airport $A_d$ from the destination airport $A_{ID}$ must be reduced for the duration of the rerouting to be as short as possible and then for the rerouting not to incur too great a delay for the passengers of the rerouted aircraft;
  on the other hand, the ground distance separating the alternate airport $A_d$ from the destination airport $A_{ID}$ must be great enough for the alternate airport to be subject to weather conditions that are substantially different from those to which the destination airport is subject.

For example, the names of the Amsterdam or Brussels airports can be associated with the destination airport name "Roissy-Charles-de-Gaulle" in an ALTERNATE DESTINATION database.

The ALTERNATE DESTINATION database is also bought by the airline companies from aeronautical database suppliers. Here too, the price of the database increases with the number of destination airports $A_{ID}$ that it contains. Consequently, an ALTERNATE DESTINATION database bought by an airline company preferably contains names of airports that the company chooses as relevant destination. That is, the airport names included in the ALTERNATE DESTINATION table are normally regularly served by the company and probably it has a technical or commercial establishment there, wholly owned or on a code-share basis.

Moreover, during the cruising phase, when the operator of the aircraft unexpectedly wants to modify the airport that the aircraft must reach, for example after discovering a failure of a critical device on the aircraft or the occurrence of a severe climatic event in the vicinity of the destination airport. Since the alternate airport programmed into the flight plan is chosen taking into account exclusively the position of the destination airport and not that of the aircraft at the moment when the rerouting is requested, the flight management system FMS proposes to the operator, at his request, a list of rerouting airports enabling him to land as early as possible. This list of rerouting airports is generated from the content of the AIRPORTS database.

One drawback of the list of rerouting airport names compiled from the AIRPORTS database arises from the fact that the content of the list is determined without taking into account the frequency with which the airports are served by the company. In other words, the content of the list does not take account of whether airports belong to the company's network.

Now, this information is important, because it conditions the cost of the rerouting for the company: in practice, for logistical reasons, this cost is higher when a rerouting takes place to an airport in which the company is not present than when the rerouting takes place to an airport in which the company has a technical or commercial representation. Still for logistical reasons, the delays incurred for the passengers of the rerouted aircraft are normally shorter when the rerouting takes place to an airport in which the company has a representation. For these two reasons, it would be good to prioritize such airports at the moment when a rerouting is envisaged.

Moreover, another drawback is encountered in certain particular situations, for example when an aircraft rerouting takes place above a continental zone which is densely populated with airports, typically Europe or the United States of America. In such a situation, there are simultaneously a large number of airports that are separated from the aircraft by a distance which is less than an immediate descent distance. The immediate descent distance is a minimum distance to be travelled by the aircraft to reach the ground. It is equal, typically, for a hundred-seat aircraft in the cruising phase, to the distance travelled by the aircraft during twenty minutes of flight and, in a zone densely populated with airports, it is exclusively a function of the altitude of the aircraft and of the elevation of the airport to be reached.

In this particular situation, it would not seem wise to base a prioritization of the rerouting airports on a criterion linked only to the distance between a position of the aircraft and airport positions, for example, a quantity of fuel needed to reach the rerouting airport, or a total descent duration of the aircraft to the rerouting airport. In practice, a prioritization of this type causes the airports closest to the aircraft to be prioritized, disregarding in particular the airports belonging to the company's network, which are slightly more distant, but are still accessible within the same flight duration.

SUMMARY OF THE INVENTION

The aim of the invention is to overcome these drawbacks. More specifically, it relates to a method of assisting in the choice of rerouting airports for an aircraft having a position P and a speed V, wherein it comprises the following steps that consist in:
- generating a first list LAC_1 of airport names $A_i$, the first list LAC_1 comprising N airport names, i being an index between 1 and N which uniquely identifies an airport that an organization operating the aircraft chooses as a relevant destination, an air distance $d_j$ separating the position P from a position of the airport $A_j$;
- determining a number m which is a minimum between a predefined number M and the number N;
- presenting m airport names $A_i$ from the first list LAC_1 to an operator of the aircraft in a predefined order based on a criterion of flight duration separating the position P from the position of the airport $A_j$.

A first advantage of the inventive method lies in that it proposes a list of rerouting airports exclusively containing the names of airports belonging to the company's network. The choice of such a rerouting airport normally reduces the delays for the passengers of the rerouted aircraft, and the costs generated by the rerouting for the company.

A second advantage of the inventive method is to take account of the frequency with which the rerouting airport is served by the company. This advantage is based on the presumption that the delays for the passengers and the costs for the company are all the more reduced when the rerouting airport occupies an important position in the company's network. For a company, it seems easier and less costly to manage a rerouting to an airport which is a hub for its network, rather than to an airport that it links by a simple daily link and even more so to an airport from which the company is absent.

A third advantage of the inventive method is to take account of the relative position of the aircraft and of the rerouting airports, the altitude of the aircraft, the elevation of the rerouting airports and a wind for generating a list of rerouting airports. The aim is thus to propose airports belonging to the company's network provided that it is not longer to reach them than another airport in the AIRPORTS database: safety considerations are therefore always given priority.

The invention also relates to a device for assisting in the choice of rerouting airports implementing a method according to the invention, said device having access to a first CoRoute database and a second ALTERNATE DESTINATION database, said device knowing a position P of the aircraft, an altitude H corresponding to the position P of the aircraft and a speed V of the aircraft, said device having access to a first list LAC_1 of airport names Ai, the first list LAC_1 containing all the names of airports $A_i$ included in a first CoRoute database or a second ALTERNATE DESTINATION database, for each of the airports $A_i$ included in the list LAC_1, an indicator $O_i$ being determined, said indicator $O_i$ defining a number of occurrences of the name $A_i$ in the first and second CoRoute and ALTERNATE_DESTINATION databases, wherein it comprises:
- means for determining an air distance di separating the position P of the aircraft and a position of an airport Ai;
- means for calculating an immediate descent distance Ds(Ei) between the altitude H and an elevation Ei corresponding to the position of the airport Ai;
- means for arranging the airport names in the first list LAC_1 in a predefined order which depends on the position P of the aircraft;
- a presentation device which presents to an operator:
  - an estimation of the time of arrival of the aircraft at the airport Ai;
  - an estimation of the heading to be followed by the aircraft to reach the airport Ai from the position P;
  - the air distance dj;
  - an estimation of a quantity of fuel needed for the aircraft to link the position P to the position of the airport Ai.

Furthermore, the invention relates to a device for generating a first list LAC_1 for a device for assisting in the choice of rerouting airports according to the invention, wherein the first list LAC_1 is generated from the first CoRoute database and the second ALTERNATE DESTINATION database, and in that said generation device also determines, for each of the airports Ai of the first list LAC_1, an indicator $O_i$ which defines a number of occurrences of the airport name Ai in the first and second databases.

Finally, the invention relates to a flight management system of an aircraft, wherein it comprises:
- means for determining a position P of the aircraft, an altitude H corresponding to the position P of the aircraft and a speed V of the aircraft;
- a device for assisting in the choice of rerouting airports according to the invention.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 3 illustrates an exemplary page presenting the nearest airports;

From one figure to another, the same elements are identified by the same references.

DETAILED DESCRIPTION OF THE INVENTION

Figure 2:
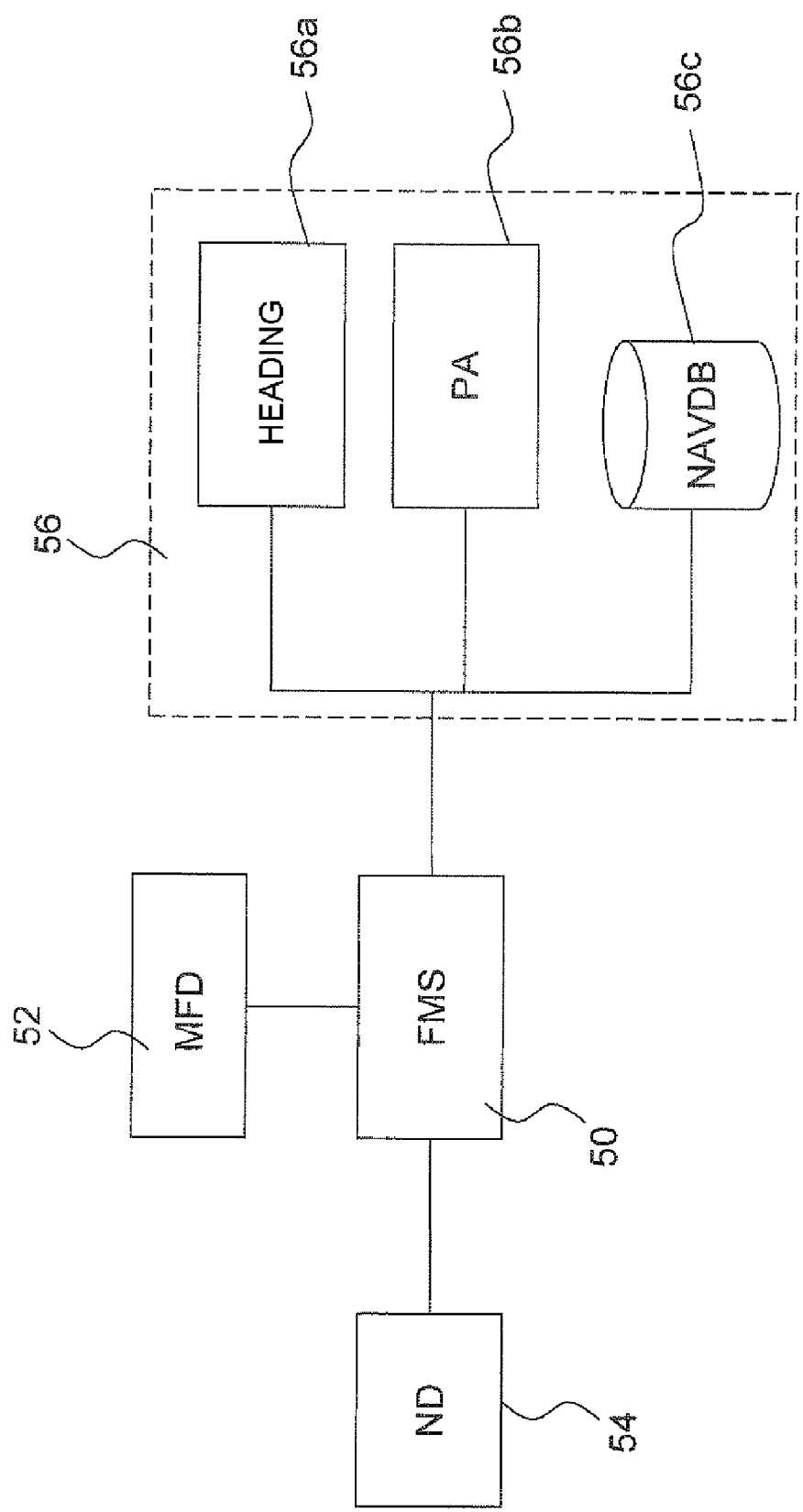
FIG. 2 diagrammatically represents an FMS computer linked to various items of equipment.

An aircraft is equipped with a flight management computer FMS. As represented in FIG. 2, the computer FMS 50 is linked to at least one man-machine interface, for example an MFD 52 (MFD standing for multi-function display) called "head down" interface, a navigation screen ND 54 (ND standing for navigation display), various onboard items of equipment 56 (sensors CAP 56a, automatic pilot PA, 56b, navigation database NAVDB 56c, and so on). The interface with the operator comprises display screens associated with a selection device enabling the operator to check, select and/or modify certain displayed fields.

The method according to the invention enables the operator to present a list of rerouting airports belonging to the network of the airline company operating the aircraft.

The method according to the invention applies during the cruising phase, when a cruising page can be displayed on the man-machine interface 52. This interface shows the active destination airport, that is, the airport as initially planned.

When the operator wants to make a change to the destination airport following an incident on board the aircraft or even following an alarm concerning a meteorological event likely to be hazardous in the vicinity of the destination airport, the operator must choose a rerouting airport to land the aircraft at.

According to the prior art described above, a list of alternate airport names is accessible to the operator. This list is obtained from an AIRPORTS database accessible to the FMS. The airports that make up this list satisfy distance criteria, expressed as "ground distance", relative to the position of the aircraft.

According to the invention, it is proposed to present to the operator a list of rerouting airports which contains exclusively airports belonging to the network of the company operating the aircraft. The airports that make up this list are necessarily part of the network of the company operating the aircraft. The names of the airports are presented to the operator in the form of a vertical list, as represented in FIG. 3, displayed on the MFD 52, in a pre-established order which prioritizes the rerouting airports according to their interest and the flight duration to reach them. For example, the more interesting an airport seems to be for a rerouting, the higher its name will be on the MFD 52.

Advantageously, the flight duration criterion is based on a calculation of air distance $d_i$ separating the position P and the position of the airport $A_i$.

Advantageously, the presentation of the m airport names $A_i$ of the first list LAC_1 also consists in presenting, for each airport name that is presented, an estimation of the time of arrival of the aircraft at the airport $A_i$, an estimation of the heading to be followed by the aircraft to reach the airport $A_i$ from the position P;

the air distance $d_j$ separating the position P from the position of the airport $A_i$;

an estimation of a quantity of fuel needed by the aircraft to link the position P to the position of the airport $A_i$.

The MFD 52 also shows wind information, that can be modified by the operator, taken into account to evaluate the speed V of the aircraft. The wind information consists of a number value representing the wind speed, expressed in knots. The characters "HD" and "TL" indicate a resultant direction of projection of wind direction on a direction of movement of the aircraft. "HD" denotes a direction opposite to the movement of the aircraft, and "TL" denotes a direction identical to the movement of the aircraft.

Figure 4:
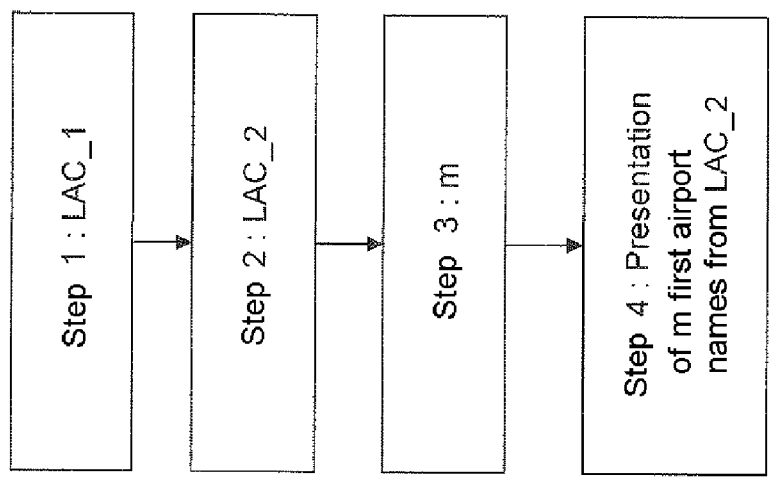
FIG. 4 is a flow diagram of the method according to the invention.

FIG. 4 is a flow diagram of the method according to the invention. The various steps of the method according to the invention included in this flow diagram are detailed below.

A first step of the method according to the invention consists in generating a first list LAC_1 of airport names $A_i$ served by the airline company operating the aircraft. The first list comprises N airport names $A_i$, i being an index between 1 and N which uniquely identifies an airport served by the company.

Advantageously, the generation of the first list LAC_1 of airport names $A_i$ is associated with a determination of an indicator $O_i$, the indicator $O_i$ indicating the importance of the airport $A_i$ in the network of the organization operating the aircraft.

Advantageously, the generation of the first list LAC_1 of airports $A_i$ comprises the following steps which consist in:

determining a number K of different airport names $A1_k$ included in a first CoRoute database, the first database containing the names of airports $A1_k$ that the organization can link by a direct path with one of its aircraft, k being an index between 1 and K;

determining a number of occurrences $Occ(A1_k)$ of the airport name $A1_k$ in the first CoRoute database;

compiling the first list of airport names $A_i$ from airport names $A1_k$;

assigning the number of occurrences $Occ(A1_k)$ as a value to the indicator $O_i$.

Advantageously, the generation of the first list LAC_1 of airports $A_i$ also comprises the following steps which consist in:

determining a number L of different airport names $A2_l$ included in a second ALTERNATE DESTINATION database, the second database containing names of potential rerouting airports for the aircraft, l being an index between 1 and L;

determining a number of occurrences $Occ(A2_l)$ of the airport name $A2_l$ in the second ALTERNATE DESTINATION database;

for any index l between 1 and L, when an airport name $A2_l$ is not included in the first list, adding the airport name $A2_l$ to the first list of airports $A_i$;

for any index l between 1 and L, when an airport name $A2_l$ is identical to an airport name $A_i$ in the first list LAC_1, adding the occurrence $Occ(A2_l)$ to the value of the indicator $O_i$.

The main aim of this first step is to determine, from the airports included in the FMS database, which are those that belong to the company's airport network.

A second objective of this step is to gather the information with which to prioritize these airports according to the importance of the place that they occupy in this network. This information involves counting the occurrences of the airport names included in the first CoRoute database or the second ALTERNATE DESTINATION database.

Advantageously, the method according to the invention also comprises a presentation step associated with the airport name $A_i$ and the indicator $O_i$.

Advantageously, the presentation device of the device according to the invention also presents, to the operator, the indicator $O_i$ of each of the airports $A_i$ included in the first list LAC_1.

The combined presentation of an airport name $A_i$ and its indicator $O_i$ is given in the form of a page like that presented in FIG. 3. The values of the indicator $O_i$ are entered in a column identified by "NTWK CNT".

This presentation can also be produced in the form of an AIRPORTS page summarizing information on a given airport $A_i$. One example of presentation of the "DATABASE AIRPORT" page is presented in FIG. 5. The values of the indicator $O_i$ are entered in a text field "NTWK CNT".

Consideration is then given to a position P occupied by the aircraft and a speed V of the aircraft.

Advantageously, the position of the aircraft P is a current position occupied by the aircraft.

Advantageously, the speed V is a current speed reached by the aircraft.

Advantageously, the speed V is a current speed reached by the aircraft corrected by a wind value supplied by the operator.

Advantageously, the position P is an estimation of the position reached by the aircraft.

Advantageously, the speed V is an estimation of the speed reached by the aircraft.

Advantageously, the speed V is an estimation of the speed reached by the aircraft corrected by a wind value supplied by the operator.

Advantageously, the speed V is an estimation of the speed reached by the aircraft corrected by a wind value extrapolated from information originating from onboard sensors on the aircraft and wind information used to make wind estimations on the flight plan.

Advantageously, the device according to the invention also comprises a device for predicting position information P, the altitude H and the speed V of the aircraft along a flight plan and the information is used to determine a list of rerouting airports.

The "air distance" $d_j$ defines an estimation of distance that an aircraft must travel to reach from a position P a determined position, for example, the position of a rerouting airport $A_j$. The air distance takes account, for example, of a wind characterized by a force and a direction. The characteristics of the wind to be taken into account are supplied by the operator via an interface.

An "air distance" assessment also takes into account changes of heading that the aircraft must follow to reach the position $A_j$. The "air distance" is evaluated by the FMS.

Figure 1:
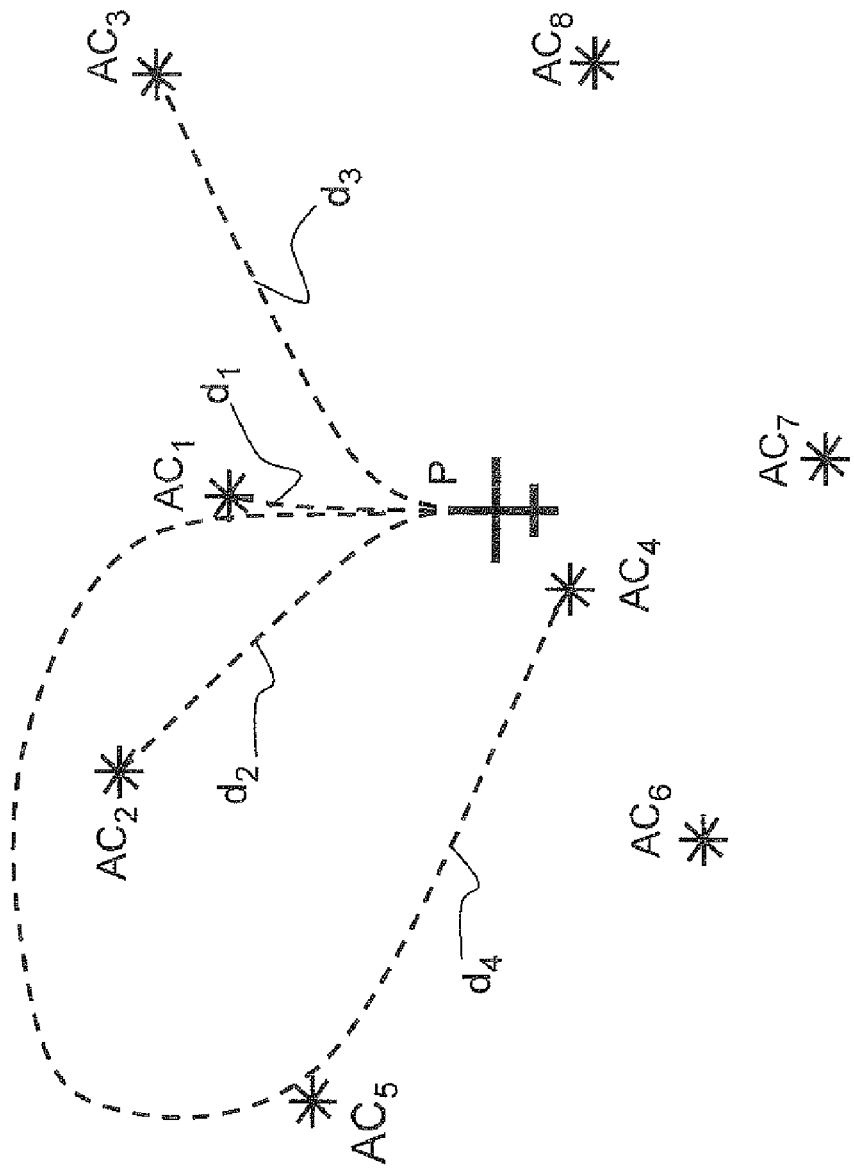
FIG. 1 illustrates an aircraft rerouting situation.

FIG. 1 is a view from above of a position P of an aircraft and of the positions of airports $A_i$. The distance, in the Euclidean sense, separating P and the positions of the airports $A_i$ is different from the air distance separating the same positions and which is represented by a curved path length linking P and $A_i$.

A second step of the method according to the invention consists in generating a second list LAC_2 of airport names.

Advantageously, the predefined order of presentation of m airport names from the first list LAC_1 consists in presenting m first airport names from the second list LAC_2.

There are three separate methods for generating the second list LAC_2. These three methods are described below:

First method: the second list LAC_2 of airport names $AC_j$ comprises all the airport names $A_i$ from the first list LAC_1, j being an index between 1 and N, $AC_j$ uniquely identifying an airport in the first list LAC_1.

Consider an elevation $E_i$ and an immediate descent distance $D_s(E_i)$:

$E_i$ is the elevation of the airport having the name $A_i$, $D_s(E_i)$ is a minimum air distance for the aircraft to reach the elevation $E_i$ from an altitude H corresponding to the position P.

A first sublist SLAC_1 is extracted from the first list LAC_1 which contains the names of airports $A_i$ for which the air distance $d_j$ separating the position P from the position of the airport $A_i$ and the immediate descent distance $D_{soi}(E_i)$ are equal. The first sublist SLAC_1 comprises p airport names, the p airport names $A_i$ being arranged in descending order of indicators $O_i$.

A second sublist SLAC_2 comprises N-p airport names $A_i$ from the first list LAC_1, which are not included in the first sublist SLAC_1. The N-p airport names $A_i$ are arranged, in the second sublist SLAC_2, in ascending order of air distances $d_i$.

The second list LAC_2 of airport names $AC_j$ consisting of a concatenation of the first sublist SLAC_1 and the second sublist SLAC_2.

Second method: the second list LAC_2 of airport names $AC_j$ comprises all the airport names $A_i$ from the first list LAC_1, j being an index between 1 and N, $AC_j$ uniquely identifying an airport in the first list LAC_1.

The airport names $A_i$ are arranged in the second list LAC_2 in ascending order of air distances $d_i$.

Third method: the second list LAC_2 of airport names $AC_j$ comprises all the airport names $A_i$ from the first list LAC_1, j being an index between 1 and N, $AC_j$ uniquely identifying an airport in the first list LAC_1.

The airport names $A_i$ are arranged in the second list LAC_2 in descending order of indicators $O_i$.

The operator can choose an option for presentation of the m airport names from the first list LAC_1, by choosing one of the three methods for generating the second list LAC_2.

The predefined order in which the airport names are presented to the operator which corresponds to a second list generated according to the first method described above, effectively prioritizes airports that the aircraft can link from the position P with a cruise of zero length. In other words, a first choice of airports that is proposed to the operator corresponds to airports that the aircraft can reach directly in the descent phase from the position P. In this first choice of airports, priority is further given to the airports that are most served by the company.

Advantageously, the calculation of immediate descent distance $D_s(E_i)$ between the altitude H corresponding to the position P of the aircraft and the elevation $E_i$ corresponding to the position of the airport $A_i$ is based on a descent flight profile of the aircraft which is a function of the speed V assigned to the aircraft.

For example, the descent flight profile is defined laterally by a great circle route between the altitude H corresponding to the position P of the aircraft and the elevation $E_i$ corresponding to the position of the airport $A_i$ and the descent flight profile is defined vertically by:

a cruise, Cr, at the altitude H, performed at the speed V with an appropriate thrust to maintain the speed $V_{CRZ}$ constant;

a first descent, D1, the altitude H to a second predefined altitude $H_{LIM}$ corresponding to the noise reduction altitude, performed at a second speed $V_{DES}$, with an idle thrust;

a second descent, D2, from the second altitude to a third altitude $H_{App}$, corresponding to a standard approach interception altitude, performed at a third speed $V_{LIM}$, and an appropriate thrust for maintaining the third speed constant;

a third descent, D3, from the third altitude to reach the elevation $E_i$, at constant deceleration from the third speed $V_{LIM}$ to an approach speed $V_{app}$.

The great circle route which laterally defines the descent flight profile is a vertical plane P0 passing through two points located on the Earth, that is, a plane passing through the centre of the Earth, the position P and the position of the airport $A_i$.

For example, the maximum thrust corresponds to 80% of the total thrust of the aircraft, the idle thrust corresponds to 20% of the total thrust.

A third step of the method according to the invention consists in determining a minimum m between the number N of airport names included in the first list LAC_1 and a number M.

This step makes it possible to configure a number m of rerouting airports to be presented to the operator. The number m is greater than or equal to 1 and less than or equal to N.

For example, M is equal to 3 or 4 so as not to overburden the operator with a list of too many airports.

A fourth step of the method according to the invention consists in presenting m first airport names from the second list LAC_2 to an operator of the aircraft.

The first step ensures that the airport names presented to the operator are part of the company's network. The second step ensures that the order in which the airport names are presented is a function on the one hand of the flight duration and importance of the place that they occupy in the network of the airline company.

Moreover, the invention relates to a device for generating a first list LAC_1. This generation device is used by ground operators, for example on the ground, to periodically generate a first list LAC_1. The first list LAC_1 is used by an operator, for example a pilot of the aircraft, to choose a rerouting airport on each flight of the aircraft.

Advantageously, the device for generating a first list LAC_1 according to the invention enables an operator, via an interface, to:

delete and/or add an airport name $A_i$ in the first list LAC_1;

modify the number of occurrences $O_i$ of the airport $A_i$ in the first and the second COMPANY ROUTE and ALTERNATE DESTINATION databases.

The invention also relates to a flight management system.

Advantageously, the flight management system according to the invention uses a first list LAC_1 generated by a generation device according to the invention.

Advantageously, the flight management system according to the invention also comprises:

a graphical display device for representing positions of airports in a geographic zone, means for highlighting positions of airports Ai included in the first list LAC_1.

The representation of the geographic positions of the airports is produced on the navigation screen ND 54. The representation takes the form of a projection in the plane of the ground of the relative positions of the different airports in a given geographic zone. The airports are represented, for example, as in FIG. 1; by graphical symbols such as asterisks.

For example, one way of highlighting consists in showing different graphical symbols, or graphical symbols of different colours depending on whether they are or are not included in the airport names presented to the operator.

Advantageously, the flight management system according to the invention comprises means for displaying the position, the elevation, the length of the longest runway, the radionavigation beacon, the number of occurrences of each airport $A_i$ belonging to the list LAC_1 whose name is presented to the operator by a device for assisting in the choice of rerouting airports according to the invention.

Figure 5:
FIG. 5 illustrates an exemplary page presenting information on an airport.

FIG. 5 is an illustration of a page presenting such information.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalent thereof.

The invention claimed is:

1. A method of assisting in rerouting for an aircraft operated by a company, the method comprising:

generating a first list of airport names, the first list including: (a) a first predetermined number of airport names selected from a first airport database, the first airport database including airport names associated with exclusively airports identified by the company as within a company's airport network, (b) air distances between a position of the aircraft and a first set of airports associated with the airport names in the first list, and (c) importance indicators for the first set of airports, the generation of the first list comprising:

identifying a second predetermined number of airport names associated with a second set of airports identified by the company as reachable by a direct route; and compiling the first list of airport names based on the second set of airports;

prioritizing the airport names in the first list based on a flight duration separating the position of the aircraft from a position of at least one of the first set of airports; and displaying, by a display screen of the aircraft, a third predetermined number of airport names selected from the top of the prioritized first list.

2. The method according to claim 1, wherein the flight duration is based on a calculation of an air distance separating the position of the aircraft and the position of the at least one of the first set of airports.

3. The method according to claim 1, wherein the display of the third predetermined number of airport names further comprising displaying, for each airport associated with the displayed airport names, an estimation of the time of arrival of the aircraft at the airport;

an estimation of the heading to be followed by the aircraft to reach the airport from the position of the aircraft;

an air distance separating the position of the aircraft from the position of the airport; and an estimation of a quantity of fuel needed by the aircraft to link the position of the aircraft to the position of the airport.

4. The method according to claim 1, wherein the generation of the first list of airport names further comprises:

determining a number of occurrences for an airport name in the first airport database; and assigning the number of occurrences as a value of the importance indicator for the airport name.

5. The method according to claim 4, wherein the second list of airport names comprising all the airport names from the first list, the airport names in the second list are arranged in descending order of importance indicators, wherein the prioritizing the airport names in the first list is based on an order of the second list.

6. The method according to claim 1 wherein the generation of the first list of airport names further comprises:

generating a second list of airport names, the second list including a fourth predetermined number of airport names selected from a second airport database, the second airport database including airport names associated with airports identified by the company as potential rerouting airports;

determining numbers of occurrences for the airport names in the second airport database;

adding an airport name in the second list but not in the first list to the first list; and adding a number of occurrences for an airport name in the second list to a value of the importance indicator of an identical airport name in the first list.

7. The method according to claim 1, wherein the second list airport names comprises:

all the airport names from the first list an elevation of an airport included in the second list;

an immediate descent distance being a minimum air distance for the aircraft to reach the elevation from an altitude corresponding to the position of the aircraft;

a first sublist being extracted from the first list and containing at least one airport name of an airport that an air distance separating the position of the aircraft from the position of the airport and the corresponding immediate descent distances are equal, the at least one airport name in the first sublist being arranged in descending order of the importance indicator of the airport;

a second sublist comprising the other airport names from the first list not included in the first sublist, the airport names in the second sublist being arranged in ascending order of air distances to the airports included in the second sublist, the second list of airport names is formed according to a concatenation of the first sublist and the second sublist, wherein the prioritizing the airport names in the first list is based on an order of the second list.

8. The method according to claim 7, wherein the immediate descent distance between the altitude corresponding to the position of the aircraft and the elevation corresponding to the position of the airport are calculated based on a descent flight profile of the aircraft which is a function of a speed of the aircraft.

9. The method according to claim 8, wherein the speed is a current speed reached by the aircraft.

10. The method according to claim 8, wherein the speed is a current speed reached by the aircraft corrected by a wind value.

11. The method according to claim 8, wherein the speed is an estimation of the speed reached by the aircraft.

12. The method according to claim 8, wherein the speed is an estimation of the speed reached by the aircraft corrected by a wind value.

13. The method according to claim 8, wherein the speed is an estimation of the speed reached by the aircraft corrected by a wind value extrapolated from information originating from onboard sensors on the aircraft and wind information used to make wind estimations in a flight plan.

14. The method according to claim 1, wherein the second list of airport names comprising all the airport names from the first list, the airport names in the second list are arranged in ascending order of air distances from the position of the aircraft to positions of the airports included in the second list, wherein the prioritizing the airport names in the first list is based on an order of the second list.

15. The method according to claim 1, wherein the position of the aircraft is a current position occupied by the aircraft.

16. The method according to claim 1, wherein the position is an estimation of the position reached by the aircraft.

17. The method according to claim 1, further comprising displaying, by the display screen of the aircraft, at least an importance indicator corresponding to one of the displayed airport names.

* * * * *